United States Patent [19]

Garberick

[11] 4,040,477
[45] Aug. 9, 1977

[54] HEAT RECOVERY APPARATUS

[76] Inventor: Thayne K. Garberick, 1510 Renfrew Drive, South Bend, Ind. 46614

[21] Appl. No.: 697,237

[22] Filed: June 17, 1976

[51] Int. Cl.$^2$ .............................................. F28D 15/00
[52] U.S. Cl. .............................. 165/103; 165/DIG. 2; 165/DIG. 12; 165/105; 432/223
[58] Field of Search ................. 165/105, 103, DIG. 2, 165/DIG. 12

[56] References Cited

U.S. PATENT DOCUMENTS

| | | | |
|---|---|---|---|
| 2,529,915 | 11/1950 | Chausson | 165/105 X |
| 3,618,659 | 11/1971 | Rawal | 165/DIG. 12 |
| 3,640,090 | 2/1972 | Ares | 165/105 X |
| 3,884,292 | 5/1975 | Pessolano et al. | 165/105 X |
| 3,905,126 | 9/1975 | Villalobos et al. | 165/DIG. 12 |

OTHER PUBLICATIONS

Popular Mechanics, *How to Get More...*, Oct. 1974, pp. 152-153.

*Primary Examiner*—Albert W. Davis, Jr.
*Attorney, Agent, or Firm*—Marmaduke A. Hobbs

[57] ABSTRACT

A heat recovery apparatus in which an exhaust gas section and a fresh air section are disposed in side-by-side relationship to form an integral unit, for recovering heat from a stack or flue and discharging fresh air into a space to be heated. Heat pipe units extend from the hot gas passage of one section into the fresh air passage of the other section to transfer the heat between the two passages, the air flow in the exhaust gas section being in a series flow relationship and the flow in the fresh air section being in a parallel flow relationship. Louvers are provided for controlling the flow of exhaust gases and fresh air through the respective passages, and blowers are used to force the exhaust gases and fresh air through the passage. The passages of each section are provided with a main and by-pass passages controlled by louvers which are used to regulate the heat recovery and output of the unit.

10 Claims, 5 Drawing Figures

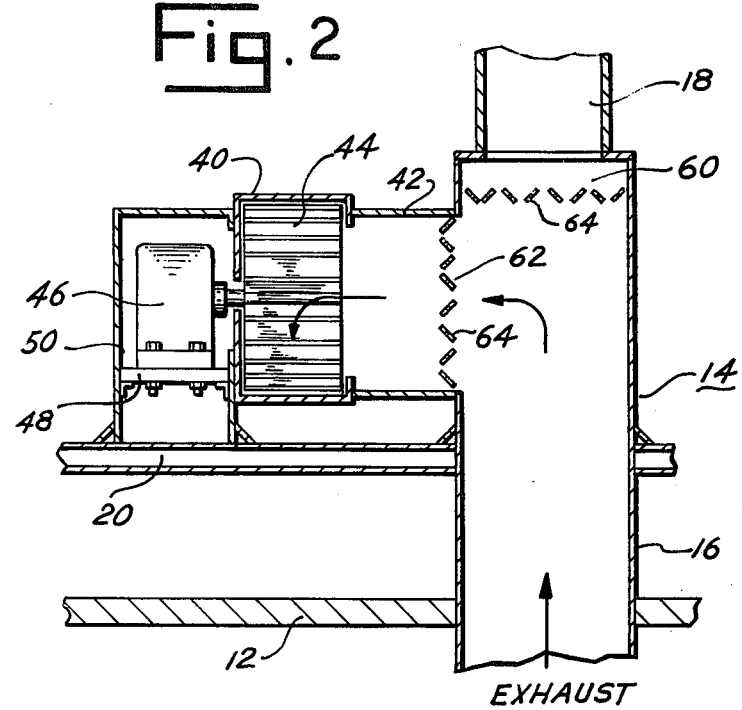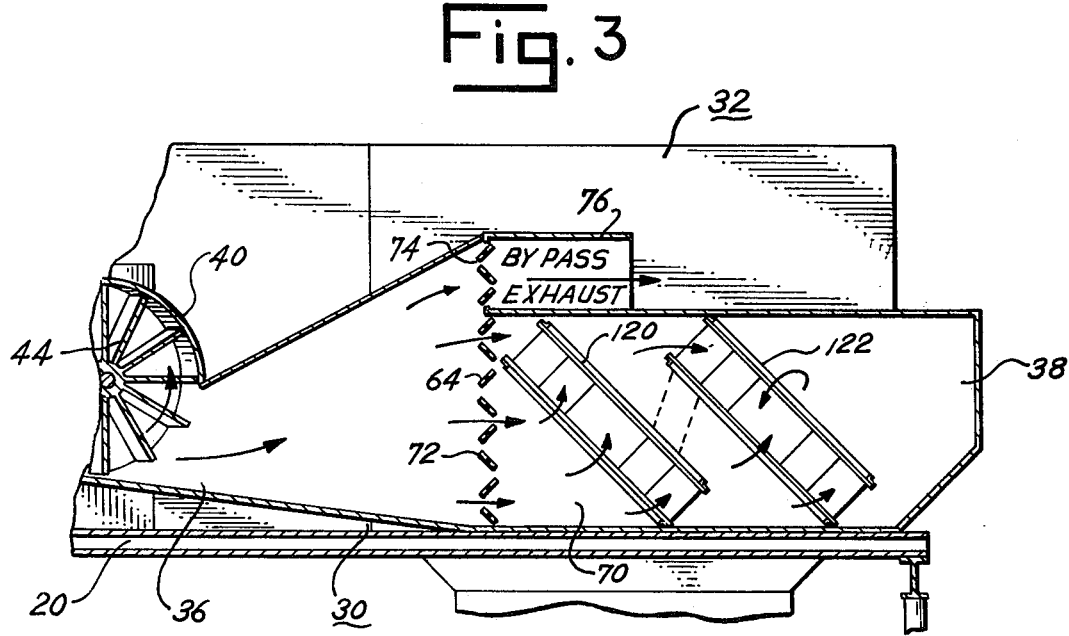

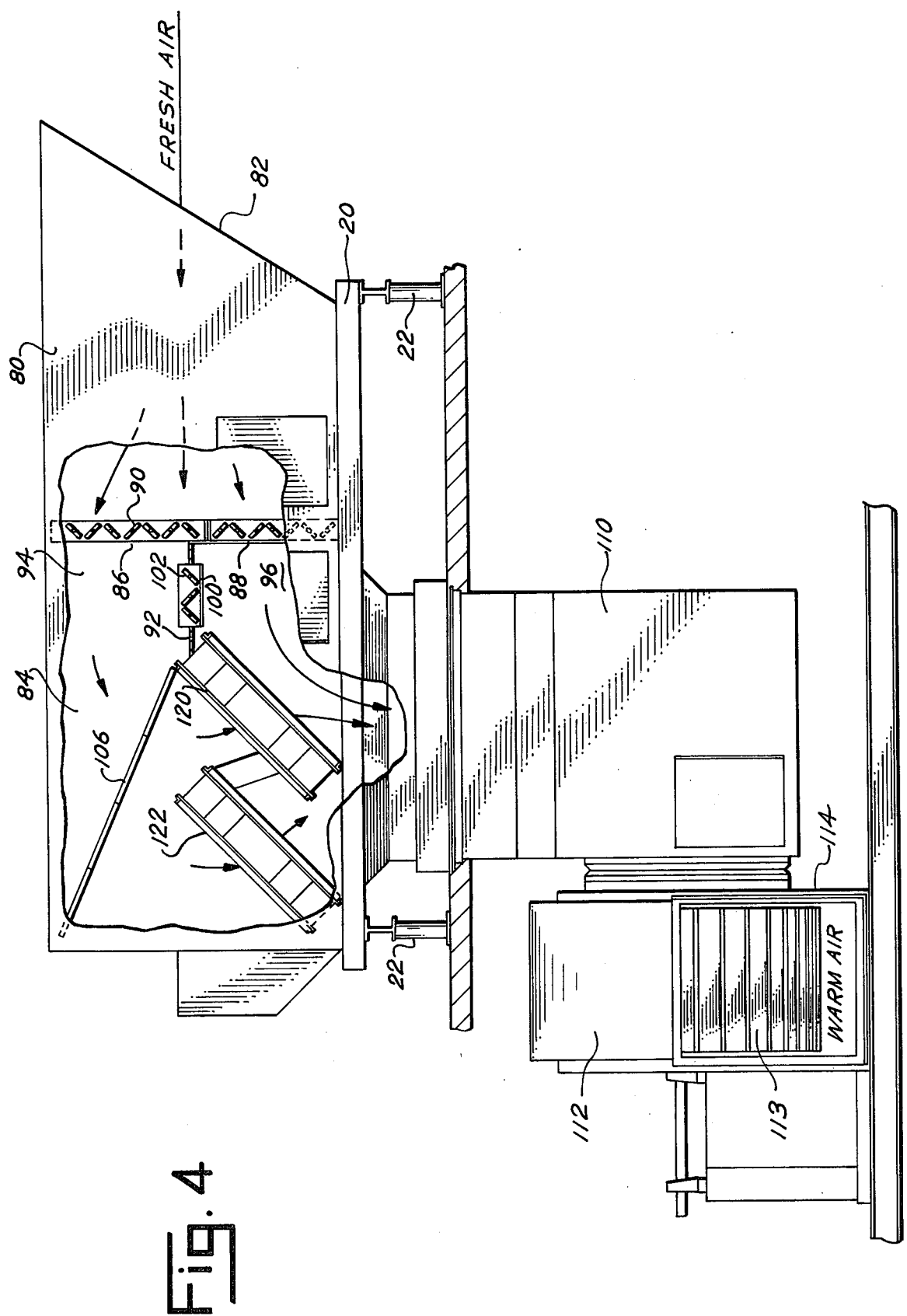

HEAT RECOVERY APPARATUS

It is well known that a substantial amount of heat is lost through the stacks or flues of industrial furnaces, space heaters, heat treating ovens and similar equipment utilizing a relatively large amount of fuel. Efforts have been made in the past to recover some of the heat lost through the stacks or flues for the purpose of utilizing this otherwise lost energy to supply space heaters in industrial plants and other commerical buildings. These prior heat recovery systems, however, have been inefficient, unreliable, or difficult to control effectively, and have been excessively large for the application, or difficult and expensive to install and maintain. The prior systems have generally been specially designed and fabricated for each installation, and hence are relatively expensive to install and thereafter service to maintain them in condition for optimum performance. It is therefore one of the principal objects of the present invention to provide an apparatus and system for recovering heat from stacks and flues, which is compact in construction and efficient in operation, and which can be installed essentially as a prefabricated unit without requiring any substantial modification in the system from which the heat is recovered or from one installation to another.

Another object of the invention is to provide a heat recovery apparatus which is virtually service free, and which has only a few mechanical operating parts, and in which these few parts are simple in construction and operation and will operate for extended periods of time with little or no attention.

Still another object of the invention is to provide a heat recovery apparatus for industrial plants and commerical establishments, which can be easily and effectively controlled from a remote control panel, or can be controlled automatically in response to the operation of the system from which the heat is recovered and/or in response to the heat requirements in the space to be heated by the present recovery apparatus.

A further object is to provide a heat recovery apparatus of the aforesaid type which can effectively be regulated from small to large recovery from the primary source of heat, and which can be easily and efficiently adjusted to provide the desired heat and fresh air delivery to the space to be heated.

Another object of the invention is to provide a heat recovery apparatus which utilizes a plurality of heat pipe units in which the heat absorption ends of units are arranged in series to recover the heat from a stack or flue from a furnace, heat treat oven or the like, and the heat delivery ends of the units are arranged in parallel, and which includes a series of louvers controlling the flow of fresh air from the recovery apparatus, and a series of louvers controls the flow of exhaust gases and smoke from the stack or flue through the recovery apparatus.

Additional objects and advantages of the present invention will become apparent from the following description and accompanying drawings, wherein:

FIG. 2 is a vertical cross sectional view through the exhaust portion of the apparatus, the section being taken on line 2 — 2 of FIG. 1;

FIG. 3 is a vertical cross sectional view, the section being taken on line 3 — 3 of FIG. 1;

FIG. 4 is an elevational and partial cross sectional view of the section of the heat recovery apparatus shown in the preceding figures, the section being taken on line 4 — 4 of FIG. 1.

Figure 1:
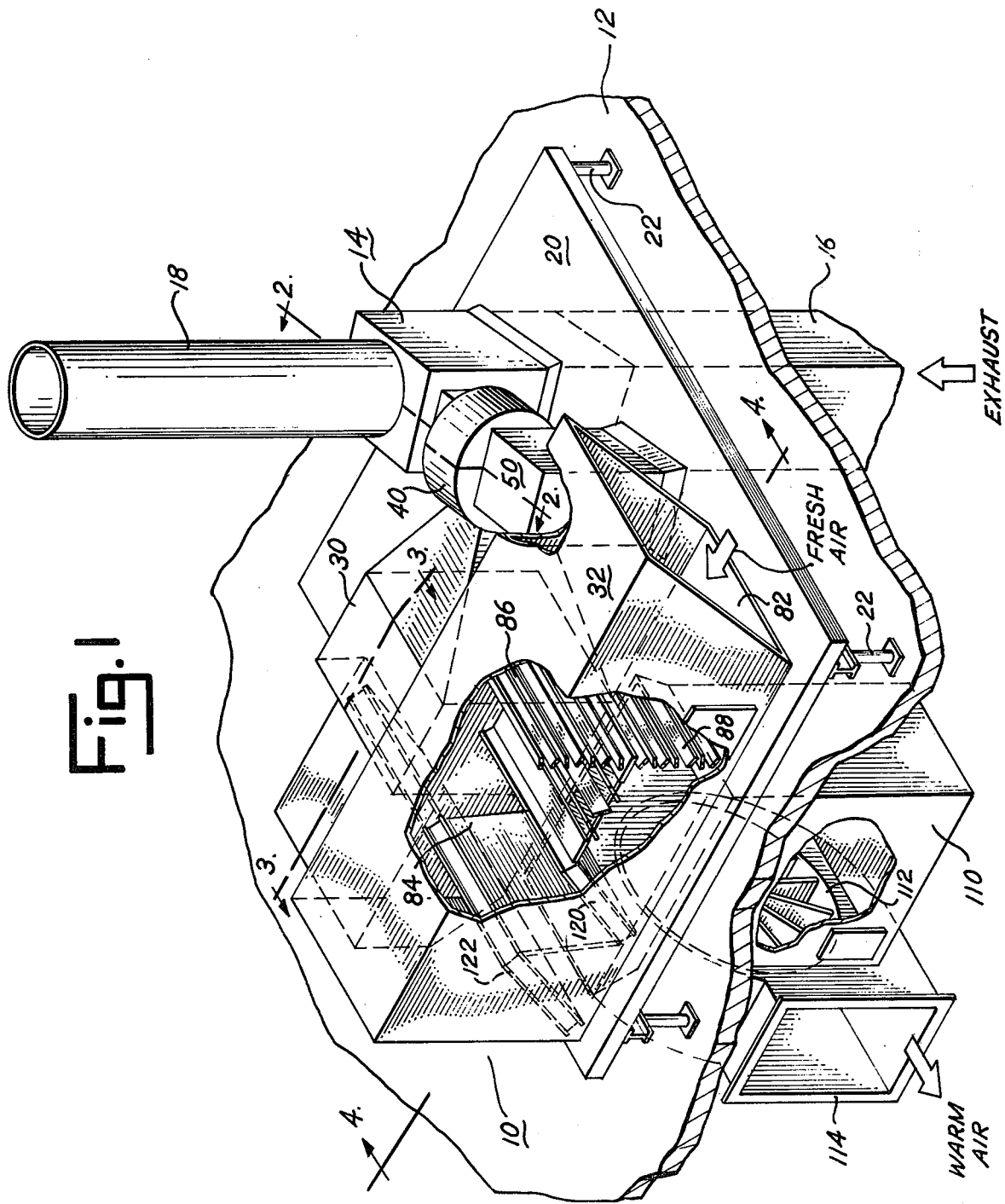
FIG. 1 is a cut-a-away perspective view of my apparatus and system, showing one type of installation.

Referring more specifically to the drawings, and to the drawings, and to FIG. 1 in particular, numeral 10 indicates generally the present heat recovery apparatus with the apparatus shown mounted above the roof 12 of a building, such as an industrial plant or a commercial building, and connected to a flue or stack 14 which extends through roof 12 and is connected to a furnace, heat treat oven or other type of equipment from which a substantial amount of exhaust gases is discharged. The stack has a lower portion 16 extending upwardly through the roof, and an extension 18 connected to lower portion 16 and extending to a desired height above the building where the hot gases and smoke are discharged into the atmosphere. The apparatus is mounted on a platform 20 supported by a frame, including legs 22 at the four corners of the platform. The flue may extend upwardly through the platform, and the air discharged from the apparatus extends downwardly through the platform and the roof, as will be more fully explained hereinafter.

My present heat recovery apparatus includes an exhaust section 30 and a fresh air section 32, the two sections having main exhaust gas and fresh air passages therethrough and preferably being disposed in a side-by-side relation and rigidly connected to one another to form an integral unit. The exhaust side 30 consists of a housing 34 having an exhaust gas intake end 36 and a hot gas outlet end 38. The exhaust inlet end includes a blower 40 which is connected to stack 14 by a pipe 42 for directing the airflow from the stack to the blower, which in turn discharges the air into inlet 36 of the exhaust section. The blower includes a rotor 44 driven by an electric motor 46 mounted on a platform 48 at the side of the blower and enclosed in a housing 50. The flow of exhaust from the stack is controlled by a pair of louver sections 60 and 62, the former being disposed in the stack above the inlet to pipe 42 and the latter being disposed in the inlet to pipe 42, each of the louver sections including pivoted vanes 64 which are controlled through a mechanical linkage to a motor, solenoid or other suitable actuating means (not shown). In order to further control the flow of air through the heat exchange chamber 70, louver sections 72 and 74 are provided at the entrance of the heat exchange chamber and at the inlet to an exhaust by-pass 76. The louvers of sections 72 and 74 are of the same general construction as the louvers previously described herein, each having vanes pivotally mounted and controlled by a suitable actuating means. It is thus seen that with the four louvers, the flow of hot exhaust gases through the exhaust section 30 can be accurately and effectively controlled to utilize the amount and degree of exhaust gases required to obtain the desired heat transfer to the fresh air side.

The fresh air section 32 includes a housing 80 having a fresh air inlet 82 and a heat exchange chamber 84 with two sections of louvers 86 and 88 being disposed between the inlet and the heat exchange chamber 84. The two louver sections include pivoted louvers 90 operated by a motor, solenoid or other suitable actuating means. A horizontal partition 92 separates the fresh air section into an upper or main passage and a lower or by-pass passage 94 and 96, respectively, and contains a louver section 100 having louvers 102 operated by a suitable actuating means. The main passage 94 directs the air from heat exchange chamber 84 and through filter 106 therein. A conduit 110 connects the chamber to a blower 112 having a rotor 113 driven by a conventional electric motor (not shown). The air from the blower passes through outlet conduit 114 which is connected to the space to be heated directly or through additional distribution conduits. Blower 112, as well as blower 40, may be variable volume types, and they are, for the purpose of the present description, considered as conventional blowers and will not be described in detail herein.

Figure 5:
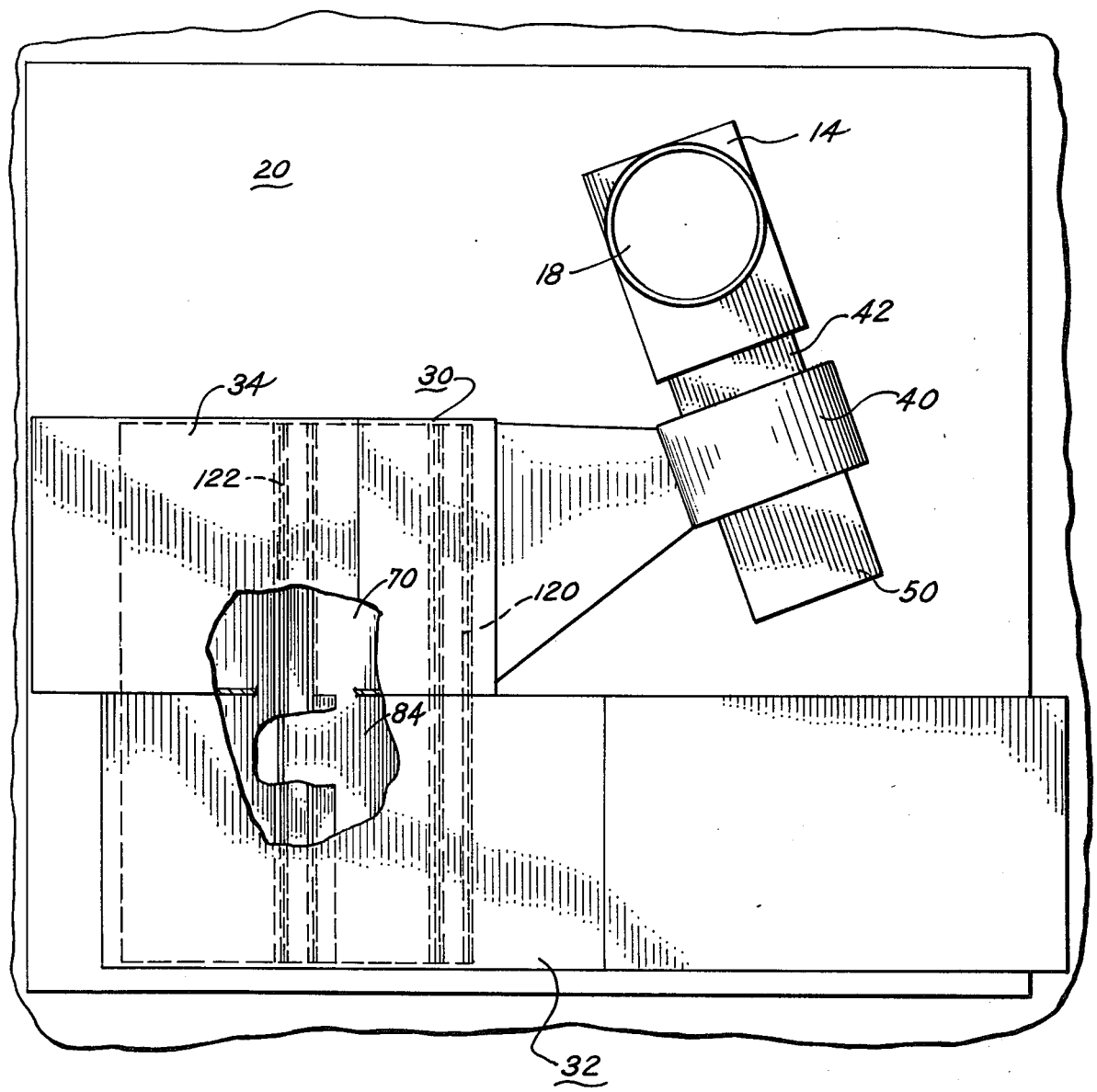
FIG. 5 is a top plan view of the heat view of the heat recovery apparatus shown in the preceding figures.

Heat is transferred from exhaust section 30 to the fresh air section 32 by a plurality of heat pipe units, the system shown in the drawing having units 120 and 122 set at approximately a forty five degree angle from horizontal in the two sections. The two heat pipe units are straight and extend the full width of the exhaust and fresh air passages, the recovery end of the heat pipe units being disposed in heat exchange chamber 70, and the delivery or condensation side being disposed in chamber 84. The heat pipe is a widely used heat transfer element and its construction and operation are well known. Generally stated, the heat pipe consists of a straight continuous tube which has a capillary wick structure and is partially filled with a refrigerant and permanently sealed. Heat applied to one end of the pipe causes the liquid refrigerant at that end to vaporize and flow to the other end of the tube where the heat is removed by conduction through the walls of the tube, thus causing the vapor to condense again into a liquid. The condensed liquid flows back to the evaporator section, in the exhaust section 30, and the cycle is repeated as long as there is an appreciable differential in temperature between the exhaust and the fresh air sections. Several different modifications of this basic type of heat pipe are available, and the present invention may utilize any one of the various types effectively. For use in the present apparatus, the heat pipes are fabricated in units such as units 120 and 122, with metal fins performing the heat absorption from the exhaust gases and the heat dissipation into the fresh air, each unit normally containing a plurality of spaced heat pipes in parallel arrangement connected to and/or supported by the fins. The fins are normally similar to those used in conventional radiators or in air conditioner condensors and are of a well known construction and operation, and hence will not be described in detail herein. While only two heat pipe units are shown in the drawings, three or more units may be used if required, and the number of heat pipes in each unit may be varied; however, each unit is straight and extends from one section to the other and across the flow passages therein, as clearly seen in FIG. 5.

In the operation of my apparatus illustrated in the drawings, the hot exhaust gases which normally pass upwardly through stack 16 and extension 18, are diverted to the exhaust section 30 by the closing of louver section 60 and opening of louver section 62 after blower 40 has commenced operation. With louver section 72 opened and louver section 74 closed, the hot exhaust gases pass through the heat pipe units 120 and 122, in series relationship, and are then discharged at exhaust outlet 38. The amount of hot gases passing through the heat pipe units may be controlled effectively by partially opening or closing the four louver sections 60, 62, 72 and 74. To obtain maximum heat utilization from the hot gases, louver sections 60 and 74 would be closed and louver sections 62 and 72 would be fully opened; thus all of the hot gases would pass from the stack through heat exchange chamber 70 and through the heat pipe units therein. With this arrangement of the louvers, the amount of heat to which the heat pipes are subjected can effectively by controlled.

As the heat pipes function in a normal manner, the refrigerant is vaporized in each of the heat pipes and flows to the ends of the pipes in the fresh air passage where the air drawn in through the fresh air inlet 82 by blower 112 passes through louver section 86 and filter 106, thence downwardly through the heat pipe units 120 and 122 in parallel arrangement. As the fresh air passes through the heat pipes, the heat dissipated thereby heats the air, which then passes through conduit 110, blower 112 and warm air outlet 114 to be distributed in the space to be heated, such as a production or storage area or office spaces in an industrial plant or commercial building. In order to obtain the desired fresh air heating capacity in section 32, three sets of louvers 86, 88 and 100 are used to adjust the air flow. For example, if a maximum heat recovery is required or desired, louver sections 88 and 100 would be fully closed and louver section 86 would be fully opened; while, if the maximum capacity of the fresh air section is not required, louver section 86 may be partially closed and either of louver sections 88 and 100 partially opened. In either of the two sections, fans 44 and 112 may be driven at various predetermined speeds in order to further control and vary the capacity of the two sections in accordance with requirements.

One of the important advantages of the present apparatus is the simplicity and compactness which permits the apparatus to be prefabricated to general specifications and then installed in a number of applications without any substantial modification of the apparatus, those modifications mostly, if not entirely, being in the parts required for connection to the exhaust stack and to the fresh air distribution system. While the apparatus may be of a standardized design, there may be some applications in which the basic concept of the present invention may be more effectively utilized in a different configuration while still maintaining the basic arrangement of the exhaust fresh air passages and the heat pipe units in the passages for transferring the heat from one tothe other, respectively, in series and parallel relationship, as previously described. The two sections 30 and 32 are fully separated and sealed from one another so that the exhaust gases cannot pass into the fresh air passages, and the fresh air intake is spaced a substantial distance from the exhaust discharge end, or otherwise adequately protected, to prevent the exhaust gases from entering the passages in the fresh air section. Suitable conduits and deflectors will accomplish this purpose. The fresh air volume in section 32 may be varied in response to fresh air inlet temperature while maintaining the discharged fresh air to the space at a preselected setting.

While only one embodiment of the present heat recovery apparatus has been described in detail herein, various changes and modifications may be made without departing from the scope of the invention.

I claim:

1. A heat recovery apparatus comprising an exhaust gas section having a passage therethrough for connection to a source of hot gases, a blower for forcing exhaust gases from said source through said passage, a fresh air section disposed in close proximity to said exhaust gas section and having a passage therethrough for fresh air, an outlet conduit connected to said latter passage for connection to space to be heated, a blower for forcing fresh air through said latter passage into the space to be heated, a plurality of heat pipe units, each of said heat pipe units contains a plurality of heat pipes extending from one section to the other with the evaporation ends disposed in the passage of said exhaust gas section and the condensation ends being disposed in the passage of said fresh air section, the ends of the heat pipe units in the passage of the exhaust gas section being arranged in a series flow relationship and the ends of the heat pipe units in the passage of the fresh air section being arranged in a parallel flow relationship.

2. A heat recovery apparatus as defined in claim 1 in which each of said heat pipe units contains a plurality of straight heat pipes.

3. A heat recovery apparatus as defined in claim 2 in which said units are disposed at approximately 45° with respect to the passage in which the ends thereof are disposed, and the flow through the heat pipe units in one passage is generally at right angles to the flow through the heat pipe units in the other passages.

4. A heat recovery apparatus as defined in claim 3 in which each of said passages contains a main passage and a by-pass passage, and louvers control the flow of gas or fresh air through the respective main and by-pass passages.

5. A heat recovery apparatus as defined in claim 3 in which louvers control the flow of hot gases into said exhaust gas section and said blower in said exhaust gas section is disposed between said last mentioned louver and said heat pipe units.

6. A heat recovery apparatus as defined in claim 3 in which each of said passages contains a main passage and a by-pass passage, and louvers control the flow of gas and fresh air through the respective passages.

7. A heat recovery apparatus as defined in claim 1 in which said sections are disposed in side-by-side relationship and adjoined to one another to form an integral unit.

8. A heat recovery apparatus as defined in claim 1 in which each of said passages contains a main passage and a by-pass passage, and louvers control the flow of hot gases of fresh air through the respective main and by-pass passages.

9. A heat recovery apparatus as defined in claim 1 in which louvers control the flow of hot gases into said exhaust gas section and said blower in said exhaust gas section is disposed between said last mentioned louver and said heat pipe units.

10. A heat recovery apparatus as defined in claim 1 in which said units are disposed at approximately 45° with respect to the passage in which the ends thereof are disposed, and the flow through the heat pipe units in one passage is generally at right angles to the flow through the heat pipe units in the other passage.

* * * * *